United States Patent [19]

Jeon

[11] Patent Number: 5,907,609

[45] Date of Patent: May 25, 1999

[54] METHOD AND APPARATUS FOR A UNIVERSAL HANDLING PROCEDURE OF SPECIAL SERVICES

[75] Inventor: Gye-Min Jeon, Incheon, Rep. of Korea

[73] Assignee: Daewoo Telecom Ltd., Incheon, Rep. of Korea

[21] Appl. No.: 08/755,537

[22] Filed: Nov. 21, 1996

[30] Foreign Application Priority Data

Nov. 21, 1995 [KR] Rep. of Korea ............ 95-42451

[51] Int. Cl.⁶ ............................................. H04M 3/00
[52] U.S. Cl. .......................... 379/242; 379/201; 379/216
[58] Field of Search ................................ 379/216, 395, 379/356, 242, 243, 244, 245, 201

[56] References Cited

U.S. PATENT DOCUMENTS

4,899,373  2/1990  Lee et al. ........................... 379/216
5,379,383  1/1995  Yunoki ............................... 379/242
5,544,236  8/1996  Andruska et al. .................. 379/201
5,608,789  3/1997  Fisher et al. ....................... 379/201
5,692,040  11/1997 Greenblatt .......................... 379/201

*Primary Examiner*—Scott Wolinsky
*Attorney, Agent, or Firm*—Pennie & Edmonds LLP

[57] ABSTRACT

An electronic switching system processes a plurality of special services (SS's) by storing code schemes in a first storage, receiving input data and converting the received input data into a set of input codes, detecting an identification code among the input codes, retrieving a code scheme corresponding thereto from the first storage, comparing the input codes and the code elements included in the code scheme to produce a SS result, which includes the SS data, when a format of the input codes coincides with the one defined by the code scheme, and storing the SS result in a second storage.

6 Claims, 5 Drawing Sheets

METHOD AND APPARATUS FOR A UNIVERSAL HANDLING PROCEDURE OF SPECIAL SERVICES

FIELD OF THE INVENTION

The present invention relates to a method and an apparatus for the universal handling of special services provided by an electronic switching system; and, more particularly, to a method and apparatus capable of providing a special service handling procedure adapted to a variety of special service code schemes.

DESCRIPTION OF THE PRIOR ART

In addition to the conventional telephone services, these days, telephone operating companies have begun to provide a variety of special services (SS's) such as abbreviated dialing, call forwarding, absentee answering, wake-up call, hot line and the like by using an electronic switching system (ESS).

As used herein, the abbreviated dialing refers to a SS wherein a call can be made by dialing a short abbreviated number instead of a usual full number of a receiving party. The call forwarding, also known as call transfer, involves transferring an incoming call to another designated phone number so that the incoming call can be received using the designated number. The absentee answering enables a subscriber to communicate with a caller, even when absent, by using, e.g., a voice message recorded in the ESS. The wake-up call alerts a subscriber at a requested time of a day. The hot line allows a subscriber to call a preassigned number by simply lifting the phone handset for a preset time, without dialing any number whatsoever.

For a subscriber to take advantage of such a service, he should perform a certain action using a predetermined code scheme, which sets forth in a format including a set of procedural elements and a sequence of the elements for a given SS.

A set of exemplary code schemes for use in an ESS will now be described. For an abbreviated dialing service, an abbreviated number may be assigned to a complete number by inputting data in the format of "*+99+abbreviated number+complete number+*"; whereas the assignment may be canceled by inputting data in the format of "#+99+ abbreviated number". In a similar fashion, a call forwarding may be initiated by inputting "*+88+forwarded number+*"; and the code "#+88+*" may be used to cancel the forwarding. Likewise, for the absentee answering, "*+66+*" activates the service and "#+66+*" terminates it. The wake-up call utilizes "*+77+designated time+*" for the activation thereof and "#+77+*" for its cancellation. Pressing the code, "*+33+called party's number+*", will register the number for the hot line service, and "#+33+*" will cancel the registration. As illustrated herein, the "+" symbol is not meant to be a part of the code scheme, but is used only to tell or distinguish one element from its adjacent element. Naturally, however, these code schemes tend to differ from one country to another.

Figure 1:
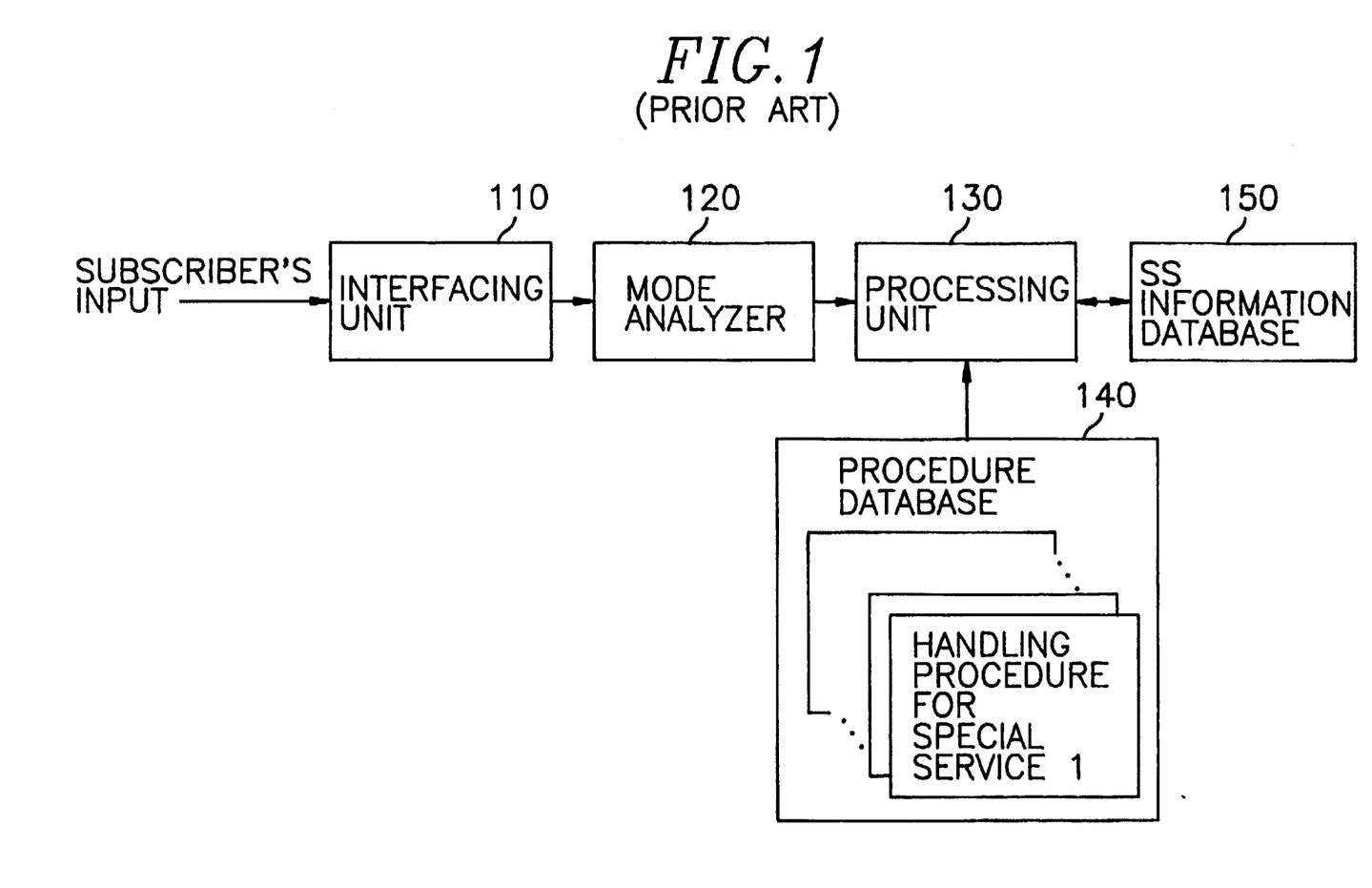
FIG. 1 illustrates a simplified functional block diagram of the SS handling apparatus according to a prior art.

On the other hand, a SS handling procedure designed to control various SS's is provided by an ESS at a central location. The SS handling procedure is a program for handling a SS request by manipulating the data provided thereto. In FIG. 1, there is illustrated an exemplary prior art apparatus which executes the SS handling procedure, shown to reside in a switching module of the ESS. In the prior art apparatus, a plurality of SS handling procedures are stored in the procedure database 140. Once a SS request, typically in the form of a service mode identifier, is received at an interface unit 110 and the service mode is identified at a mode analyzer 120, based on the identification result, a processing unit 130 retrieves a SS handling procedure corresponding to the requested SS mode from the procedure database 140 in order to carry out the request. The result of the SS handling procedure is stored in a SS information database 150. As used herein, the service mode represents the kind of the SS requested and the activation/deactivation thereof; and typically includes a prefix such as "*", "#" or a two-digit number.

A change in the code scheme forces the procedure database 140 to be modified, which tends to be a massive and cumbersome task since the modification requires an alteration in each of the SS handling procedures and the alteration should be done at each of the switching modules.

Accordingly, there has existed a need to have a universal procedure capable of handling a variety of SS code schemes without entailing any massive modification of the procedure database.

SUMMARY OF THE INVENTION

It is, therefore, a primary object of the present invention to provide a universal special service handling procedure for use in an electronic switching system (ESS).

In accordance with the present invention, there is provided a method, for use in an electronic switching system, for processing a plurality of special services (SS's), wherein a SS is provided by manipulating input data from a subscriber's station in accordance with a code scheme which defines a format of the input data for the SS, the switching system having a first storage and a second storage, the input data including SS data representing contents of the SS requested by a subscriber and the code scheme including a set of code elements having an identification code for identifying the SS, the method comprising the steps of: providing a plurality of code schemes; storing the code schemes provided from the input means in the first storage; receiving the input data and converting the received input data into a set of input codes; detecting, from the set of input codes, an input code which corresponds to the identification code to thereby generate an identification signal indicating the code scheme of the SS; retrieving the code scheme from the first storage in response to the identification signal; comparing the input codes and the code elements included in the code scheme to thereby generate a SS result which includes the SS data when a format of the input codes coincides with the one defined by the code scheme; and storing the SS result in the second storage.

BRIEF DESCRIPTION OF THE DRAWINGS

The above and the other objects and features of the present invention will become apparent from the following description of preferred embodiments given in conjunction with the accompanying drawings, in which.

DETAILED DESCRIPTION OF THE PREFERRED EMBODIMENTS

Figure 2:
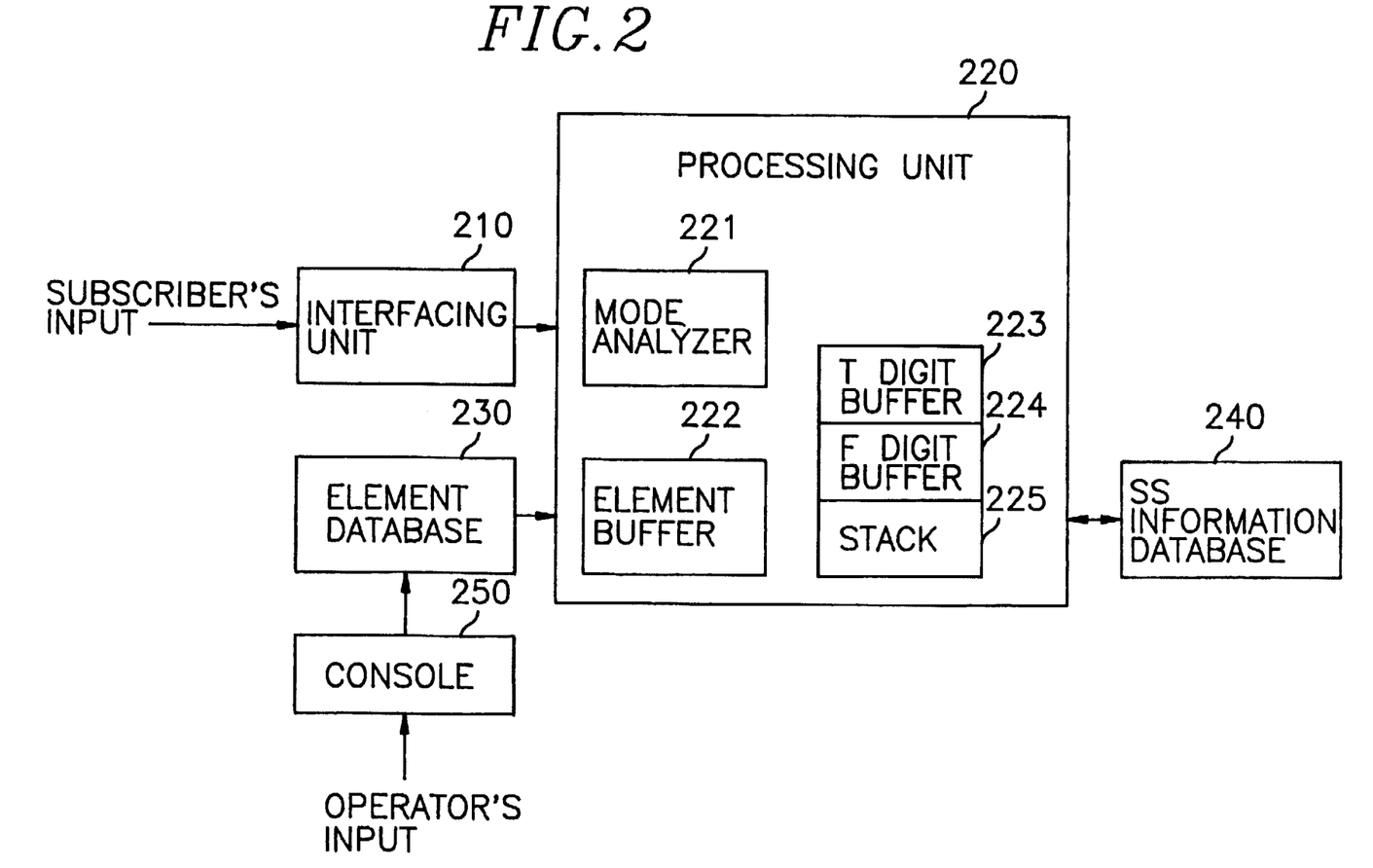
FIG. 2 represents a simplified functional block diagram of the SS handling apparatus in accordance with the present invention.

In FIG. 2, there is provided a SS handling apparatus in accordance with a preferred embodiment of the present invention, wherein the apparatus includes an interfacing unit 210, a processing unit 220, an element database 230 and a SS information database 240 and a console 250.

As described herein, the interfacing unit 210 converts a received signal to data appropriate for processing in the apparatus. The processing unit 220 is where the SS handling procedure is executed, which includes a mode analyzer 221 for interpreting the service mode, an element buffer 222 for storing each element retrieved from the element database 230, a T digit buffer 223 for temporarily storing each digit received from a subscriber and transferring the digits to an F digit buffer 224 on a block base, the F digit buffer for storing the digits received from the T digit buffer 223 before transferring the digits to the SS information database 240, and a stack 225 for storing an element for use in a determination in the procedure. The processing unit 220 controls and coordinates the operation of the SS handling procedure, e.g., receiving information from the interfacing unit 210, retrieving elements from the element database 230 and storing the result of a SS handling procedure in the SS information database 240. The element database 230 is for storing procedural elements in the code scheme, which can be easily modified by an operator through the console 250. The SS information database 240 is for storing results of the SS handling procedure including information associated with the subscriber, the mode of the SS.

Hereafter, an operation of the SS handling apparatus will be described.

Before an ESS launches SS's or when an alteration in the code schemes is needed, the code schemes are defined or modified through the console 250 by an operator and then stored in the element database 230.

When a service mode identifier is provided from a subscriber's station, the mode analyzer 221 interprets the identifier. Subsequently, the processing unit 220 retrieves each of the elements from the element database 230 one by one in accordance with the interpretation of the identifiers while performing the SS handling procedure. The outcome of the procedure is stored in the SS information database 240.

In accordance with a preferred embodiment of the present invention, there are defined SS handling procedural elements. A star_digit and a sharp_digit are to indicate a block separation between each of the elements, an end_star and an end_sharp to represent a last of the elements, an abd_digit to symbolize an abbreviated dialing phone number, a tdn_digit to indicate a subscriber's complete phone number, an hm_digit and an md_digit to represent an hour-and-minute, and a month-and-day, respectively, and a null_digit is used for terminating the SS handling procedure. As illustrated herein, the hm_digit and the md_digit are represented by an optional element while the others are not, the tdn_digit is classified as a variable length element while the others are as a fixed length element, a group of the star_digit, sharp_digit, end_star and end_sharp are referred to as a code element, and the abd_digit, the tdn_digit, the md_digit and the hm_digit are referred to as a numeric element, and the null_digit is an end element while the others are not, wherein the null_digit is used for terminating the SS handling procedure without receiving any of the end_star or the end_sharp from a subscriber in such a code scheme that does not end with the end_star or the end_sharp. All these elements are stored in the element database 230.

Figure 3A:
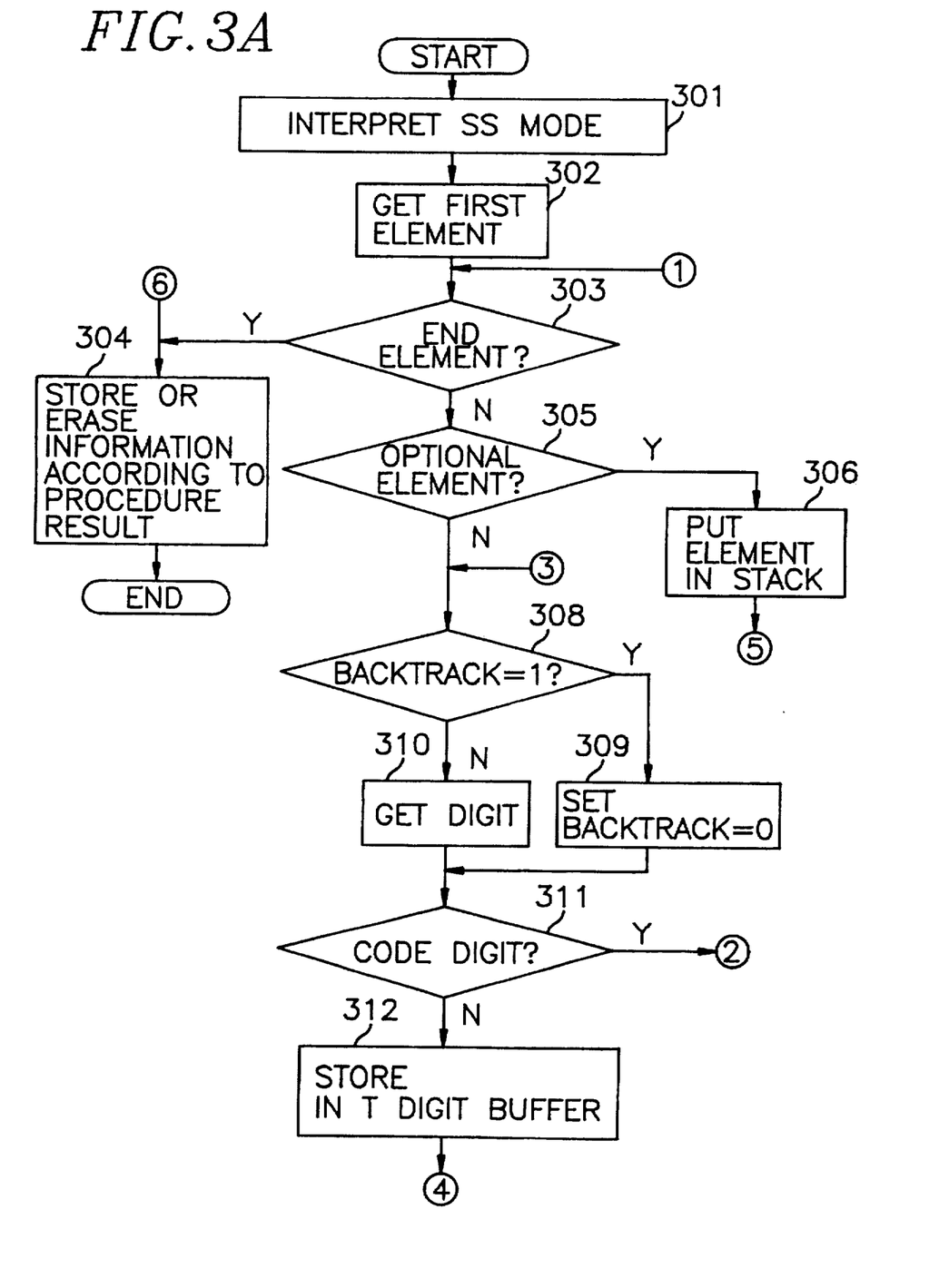
FIGS. 3A, 3B, and 3C depict a flowchart of a universal SS handling procedure of the present invention.
Figure 3B:
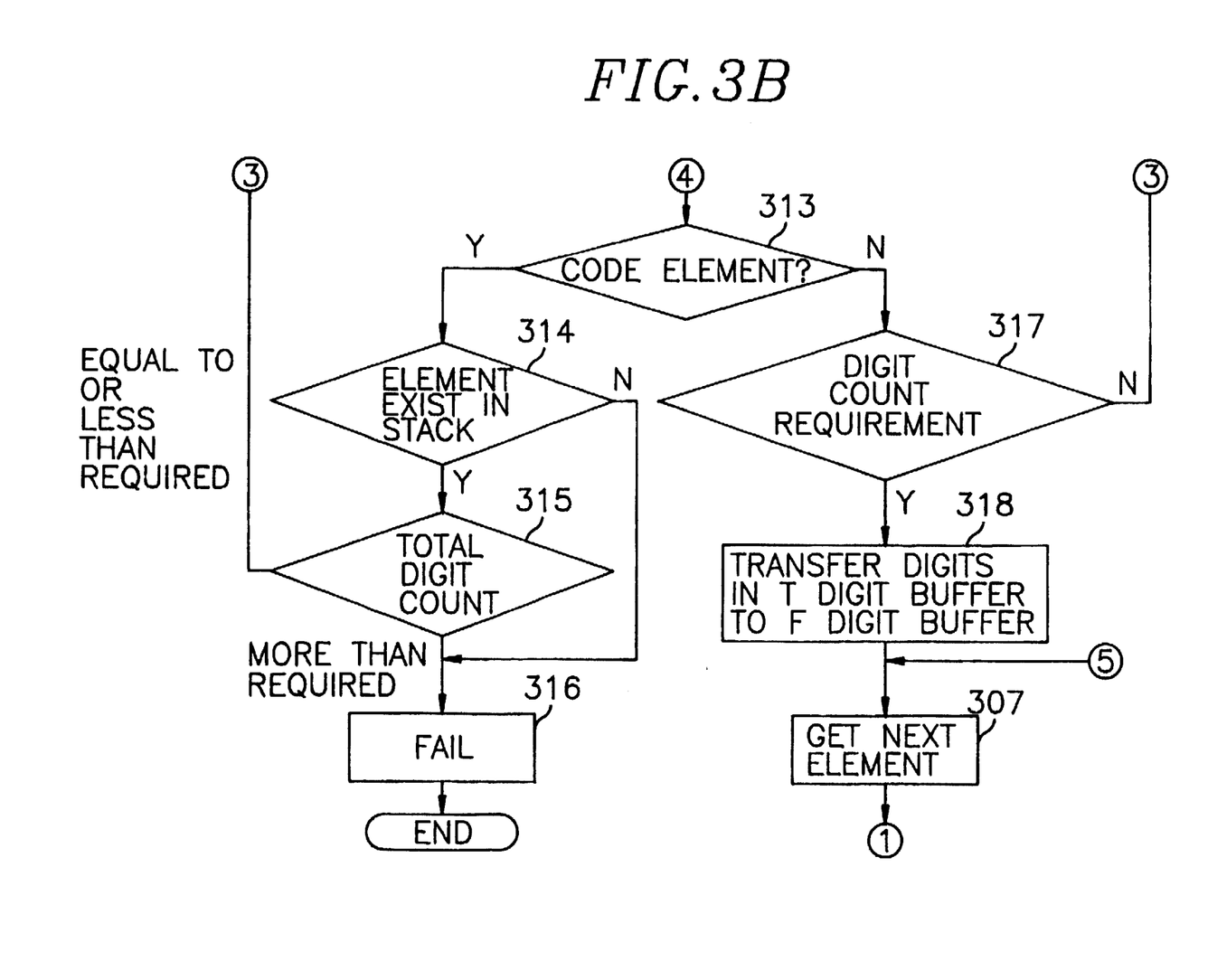
Figure 3C:
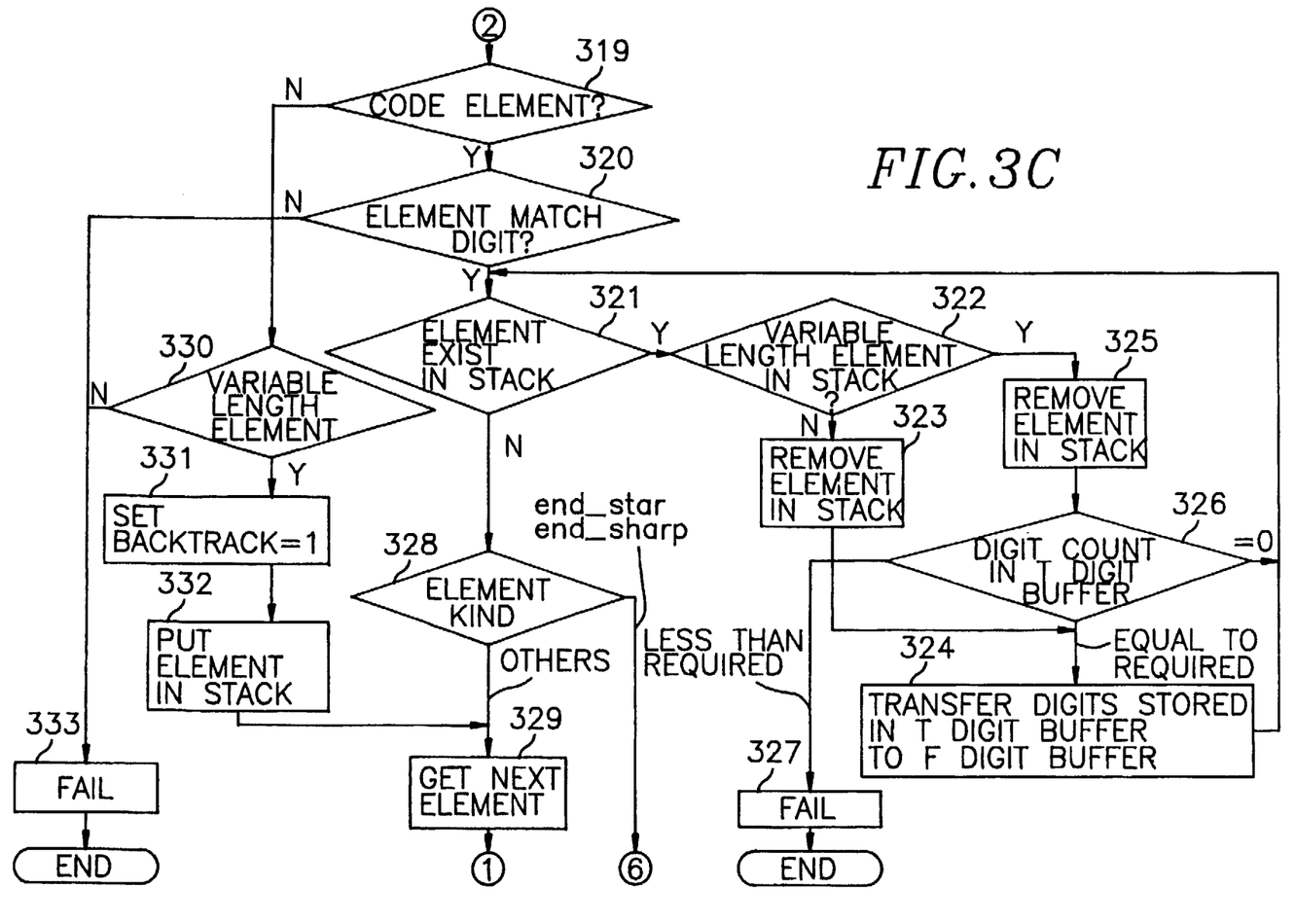

Referring to FIG. 3 in conjunction with FIG. 2, the operation of the preferred embodiments in accordance with the present invention is exemplified through detailed descriptions of two different code schemes of the abbreviated dialing service, a first one associated with an activation of the service and a second one associated with a deactivation thereof.

The operation associated with the activation will be described first in detail by using two exemplifying code schemes, one code scheme being "*+99+abd_digit+tdn_digit+*+md_digit*" and another one being "*+51+*+abd_digit+*+tdn_digit+#", wherein the abd_digit, the tdn_digit and the md_digit are assumed to be "01", "1234567" and "1231", respectively. The md_digit is included therein to show how the SS handling procedure in accordance with the present invention deals with the optional elements.

In the former code scheme case, i.e., if a SS request signal including a SS mode identifier "*99" is provided to the ESS from a subscriber's station, the interfacing unit 210 issues a start message to the mode analyzer 221 in response to the identifier. The mode of the SS request are identified at the mode analyzer 221 by interpreting the codes "*+99", then the information on the SS mode is fed to the processing unit 220.

The SS handling procedure of the present invention begins at step 301, wherein the information on the service mode is interpreted.

At the next step 302, the processing unit 220 retrieves a first element, i.e., the abd_digit that pertains to the service mode from the element database 230. At the following step 303, a determination is made as to whether or not the element is the end element. Since the abd_digit is not the end element, in the subsequent step 305, a determination is made as to whether or not the element is one of the optional elements. Since the abd_digit is not one of the optional elements, at step 308, another determination is made as to whether a backtrack is set to "1", wherein the backtrack refers to a sign to indicate that the digit received will be used without receiving an additional digit. Since the SS handling procedure is pre-arranged to start in a state that the backtrack is set to "0", at step 310, the SS handling procedure receives another digit from the subscriber. Subsequently, at the next step 311, the kind of the received digit is determined. Since the digit is a numeric 0, neither "*" nor "#", at the next step 312, the received digit 0 is stored in the T digit buffer 223. In this case, at the following step 313, the element will be determined to be the abd_digit, i.e., not corresponding to one of code elements. At next step 317, it is checked whether or not the number of the subscriber's input of digits fulfills the digit count requirement, i.e., 2 herein, and since the digit count is not "2" as is required, the procedure is returned to step 308. Meanwhile, if it is determined at step 313 that the received digit is the code element, it is checked whether an element exists in the stack at step 314. If the answer of the check at step 314 is affirmative, the number of the total received digits is counted at step 315; and if the answer is negative, the procedure is regarded as a failure at step 316. If the number of the total received digits is determined at step 315 to be equal to or less than what is required, the procedure goes back to step 308; otherwise, the procedure is also regarded as a failure at step 316. Since the backtrack is not set to "1" at step 308, another digit "1" is received at step 310. At step 311, the digit kind is checked to be a numeric, and at the following step 312, the received digit "1" is put to the T digit buffer 223. Subsequently, at step 313, the element kind is determined to be a numeric element and since at step 317, the received digit count is found to satisfy the digit count requirement 2, the two digits "01" stored in the T digit buffer 223 are transferred to the F digit buffer 224 at step 318. And then, at step 307, a next element, tdn_digit, is retrieved to the processing unit 220 from the element database 230 and then the procedure returns to step 303. Since the tdn_digit is neither the end element nor one of the optional elements, the procedure proceeds through steps of 303 and 305 to step 308. Since backtrack is not set to "1" at step 308, a digit "1" is received at step 310. At step 311, since the digit kind does not correspond to the code element, the digit "1" is put to the T digit buffer 223 at step 312. At the subsequent step 313, since the current element is the tdn_digit, and the received digit "1" does not fulfill the digit count requirement at step 317, additional digits will be received by repeating steps from 308 to 313 and 317. After the last digit "7" is received at step 310, since the digit kind is checked to be a numeric at step 311, the received digits "1234567" is stored in the T digit buffer 223 at step 312. At the next step 313, the element kind is determined as the numeric element and since at the succeeding step 317, the digit count requirement which is preset to "16" is not satisfied, the procedure is returned to step 308, wherein an additional digit "*" is received at step 310, since the backtrack is not "1". At step 311, the digit is determined as "*", and the procedure proceeds to step 319, wherein since the current element is a tdn_digit, at the next step 330, it is checked whether or not the element is a variable length element. Since the tdn_digit is a variable length element, at a next step 331, the procedure sets the backtrack to "1", puts the element in the stack 225 at step 332 and retrieves a next element from the element database 230 at step 329 and the procedure is returned to step 303. On the other hand, if it is determined that a checked digit is not a variable length element, the procedure is regarded as a failure at step 333. While the current star_digit is determined as neither the end element at step 303, nor one of the optional elements at step 305, since the backtrack is checked to be "1" at step 308, the procedure proceeds to step 309, wherein the backtrack gets set to "0". At step 311, the digit is checked as a code "*", and at the next step 319, the current digit is determined to be one of the code elements, i.e., the star_digit, and it is checked as to whether the digit "*" matches the element, star_digit, at step 320. Since the digit "*" matches the star_element, in a next step 321, it is checked whether an element exists in the stack 225. Since the element is determined to exist in the stack 225 and since the element is determined to be a variable length element at step 322, the element is removed from the stack 225 at step 325. On the other hand, if the element is determined at step 320, not to match with the received digit, the procedure is regarded as a failure at step 333. At step 326, it is checked whether or not the digit count requirement is fulfilled. Since the digit count is determined to satisfy the digit count requirement, the digit "*" is transferred to the F digit buffer at step 324. Then, the procedure returns to step 321, wherein it is determined as no element exists in the stack 225, and the element is determined as none of the end_star and the end_sharp at step 328, and thus a next element is retrieved at step 329 and the procedure is returned to step 303. If, at step 326, the digit count is determined not to satisfy the digit count requirement, i.e., the digit count is less than required, the procedure is regarded as a failure at step 327. Since the retrieved element is the md_digit, it is determined that the md_digit is not the end element at step 303, but rather one of the optional elements at step 305, and the element is put to the stack 225 at step 306. At the next step 307, the next element which is to be an end_star, is retrieved and the procedure goes back to step 303. The end_star is determined neither to be the end element nor to be one of the optional elements at steps 303 and 305, respectively, and a determination is made as to whether the backtrack is set to "1" at step 308. Since the backtrack is not set to "1", a digit which is expected to be "1" is received at step 310. The digit is checked if it corresponds to one of the code elements at step 311, which results in "No", and the received digit is stored in the T digit buffer 223 at step 312. At the following step 313, the element kind is determined to be a numeric, thus at the next step 317, wherein it is checked whether or not the digit number of the subscriber's input satisfies the digit count requirement, i.e., "4" herein, and since the requirement is not satisfied, the procedure returns to step 308. Since the backtrack is found not to be "1" at step 308, another digit "2" is received at step 310. At step 311, the digit is checked to be a numeric, and at step 312, the received digit "2" is put to the T digit buffer 223, sending the procedure to step 313, wherein the digit is determined to be not as one of the code elements. Since the received digits "12" does not satisfy the digit count requirement at step 317, additional digits will be received by repeating steps from 308, 310 through 313, and 317. After the last digit "1" is received at step 310, since the digit is checked to be a numeric at step 311, the received digits "1231" is stored in the T digit buffer 223 at step 312. At the next step 313, the element kind is determined as a numeric, sending to the next step 317, wherein the digit count requirement which is predetermined as "4" is found to be satisfied, and the received digit "1231" is transferred to the F digit buffer 224 at step 318, the procedure retrieves the next element, end_star, from the element database 230 at step 307 and the procedure is returned to step 303. Since the end_star is determined as neither the end element at step 303, nor one of the optional elements at step 305, and further, backtrack is found to be "0" at step 308, a digit "*", is received at step 310. At step 310, since the digit is "*", sending to the next step 319, wherein the element is determined as one of the code elements. Since the current element is the end_star, the received data "*" is found to match with the element end_star at the next step 320, and since there is no element in the stack 225, at the subsequent step 328 it is checked whether the element kind is either one of the end_star and the end_sharp. Since the element is the end_star, the procedure is sent to step 304, wherein the data concerning the activation of the SS request from the subscriber are stored in the SS information database 240 and then it completes the SS handling procedure.

Hereafter, the adaptability of the procedure in accordance with the present invention for the latter exemplary code scheme, "*+51+*+abd_digit+*+tdn_digit+#" will be described, wherein the abd_digit and tdn_digit are assumed to be 01 and 1234567, respectively, as in the former case.

At step 301, the service mode identifier is interpreted. At the next step 302, the first element, star_digit, is fetched from the element database 230. Then, at the succeeding step 303, it is checked whether the element is the end element. Since the "*" is not the end element, at the next step 305, it is checked whether the element is one of the optional elements. Since the star_digit is not the optional element, it is checked whether the backtrack is set to "1" at step 308. Since the SS handling procedure is programmed to start in a state that the backtrack is set to "0", at the next step 310, the procedure receives data from the subscriber. And then, at step 311, the kind of the received data is determined as "*", sending the procedure to step 319, wherein the element kind is checked to be the code element. At step 320, it is checked whether the element matches the received digit "*". Since the determination results in "Yes", it is checked whether an element exists in the stack 225 at the following step 321. Since no element has been put in the stack 225, it proceeds to step 328, wherein the element kind is determined to be neither the end_star nor the end_sharp. At the next step 329, a next element, abd_digit, is retrieved from the element database 230 and the procedure returns to step 303. Since the abd_element is checked to be neither as the end element at step 303, nor as the optional element at step 305, and further at step 308, it is checked that the backtrack is not set to "1", a digit "0" is received at step 310. At the next step 311, the digit kind is determined not to correspond to the code elements, and the digit "0" is stored in the T digit buffer 223 at the subsequent step 312. At the next step 313, the current element is checked as other than the code element, sending to the next step 317, wherein the digit count is found not to satisfy the digit count requirement, returning back to step 308. Since at step 308, it is checked that backtrack is set to "0", another digit "1" is received at step 310. Since the digit is checked not to correspond to the code element at the next step 311, the digit is put into the T digit buffer 223 at the subsequent step 312, advancing to step 313, wherein the current element kind is determined to be the abd_digit. At the next step 317, the received digits 01 are checked to satisfy the digit count requirement, therefore the digits 01 stored in the T digit buffer 223 are transferred to the F digit buffer 224 at step 318. At the next step 307, the next element, star_digit, is retrieved from the element database 230 before the procedure returns back to step 303. Since the star_digit is determined to be neither the end element at step 303 nor the optional element at step 305, and further at step 308, it is checked that backtrack is set to "0", therefore, the next data, "*", is received from the subscriber at step 310. At step 311, since the "*" corresponds to the code element, the procedure advances to step 319, wherein the "*" is determined as corresponding to a code element and proceeds to step 320, wherein the star_digit is found to match the "*". At the next step 321, it is checked whether any element exists in the stack 225. Since no element exists in the stack 225, it proceeds to step 328, wherein the element kind is decided as neither the end_star nor the end_sharp, and the next element, tdn_digit, is retrieved from the element database 230 at the following step 329, and then step proceeds back to step 303. It is checked that the tdn_digit is neither the end element at step 303, nor an optional element at step 305, and further, at step 308, it is found that backtrack is set to "0", thus it proceeds to step 310, wherein a digit, "1", is received. At step 311, the digit kind is determined not corresponding to a code element, and the digit is stored in the T digit buffer 223 at the subsequent step 312, and then it proceeds to step 313, wherein the element kind is checked to be the tdn_digit. At the next step 317, it is checked that the digit count does not satisfy the digit count requirement, sending the procedure back to step 308. The procedure will be looped through steps of 308, 310 through 313 and 317 until the last digit, "7", associated with the current element tdn_digit, is received at step 310. Then, since the digit kind does not correspond to one of the code elements, the step proceeds from 311 to step 312, wherein digit "7" is put to the T digit buffer 223. At the next step 313, the element kind is determined to be not a code element, and at the next step 317, it is found that the digits stored in the T digit buffer, 1234567, does not fulfill the digit count requirement, preset to 16, and the procedure returns to step 308. Since backtrack is set to "0" at step 308, at step 310, the next digit, "#", is inputted by the subscriber. At step 311, it is checked that the "#" corresponds to a code element, it advances to the next step 319, wherein since the current element kind is still the tdn_digit, it advances to step 330. At step 330, the current element, tdn_digit, is determined to be a variable length element, and at the succeeding step 331, the backtrack is set to "1". Then the element, tdn_digit, is put into the stack 225 at the next step 332 and the next element, sharp_digit, is retrieved from the element database 230 at the step 329 before the procedure returns back to step 303. It is determined that the sharp_digit is neither the end element at step 303, nor an optional element at step 305 and the procedure advances to step 308, wherein it is found that the backtrack is set to "1" and advances to step 309, wherein the backtrack is reset to "0". At step 311, since the "#" corresponds to a code elements, it proceeds to step 319, wherein since the element is the end_sharp, it advances to step 320. The "#" is found to match the end_sharp at step 320, and at step 321, it is checked the element, tdn_digit, is in the stack 225, and thus it proceeds to step 322, wherein the element kind in the stack 225 is determined as a variable length element and the element is removed from the stack 225 at step 325. And at the following step 326, it is determined that the digit count satisfies the digit count requirement "1", and thus the "#" is transferred from the T digit buffer 223 to the F digit buffer 224 at step 324, returning to step 321. Since no element is determined to exists in the stack at step 321, and the element kind is determined to be the end_sharp at step 328, the step advances to step 304. At step 304, the data concerning the activation of the SS request from the subscriber are stored in the SS information database 240 and completes the SS handling procedure.

Hereafter, the operation associated with the deactivation of the abbreviated dialing will be described by using two exemplary code schemes, wherein one code scheme is "#+99+abd_digit+*" and another one is "#+51+*+abd_digit+#", the abd_digit being assumed 01.

In the former code scheme case, when a SS request signal, "#99", is provided to the processing unit 220 from a subscriber's station through the interfacing unit 210. The mode of the SS request, i.e., the deactivation and the abbreviated dialing, are identified at the mode analyzer 221 by interpreting the code "#" and "99", respectively at step 301. And at step 302, the first element, abd_digit, is fetched from the element database 230. At the next step 303, it is checked whether the element is the end element. It is determined that the element, the abd_digit, is neither the end element at step at step 303, nor the optional element at step 305, and at the next step 308, it is checked whether the backtrack is set to "1". Since the backtrack is programmed to start with "0", the procedure receives a digit, "0", at step 310. Since the digit, "0", does not correspond to a code element, "0" is stored in the T digit buffer 223 at step 312 and the procedure advances to step 313, wherein it is determined that the element is not a code element. At the next step 317, it is found that the digit count, "1", does not suffice the digit count requirement, "2" in this embodiment and the procedure returns to step 308. Since the backtrack is not set to "1", another digit, "1", is received from the user at the next step 310. At step 311 and 312, it is determined that the kind of the digit, "1", is a numeric, the digit "1" is put to the T digit buffer 223 and thereafter follows step 313, wherein it is found that the element kind is a numeric. At the next step 317, it is determined that the received digit count satisfies the digit count requirement 2, the digits "01" stored in the T digit buffer 223 is transferred to the F digit buffer 224 at the subsequent step 318. And then, the next element, end_star, is retrieved from the element database 230 at step 307 and thereafter step 303 is followed. Since the end_star is determined to be neither the end element at step 303, nor an optional element at step 305, the procedure advances to step 308, wherein it is found that the backtrack is not set to "1". At the next step 310, the data, "*", is received from the subscriber, which, in turn, is determined as one of code elements at step 311, and step 319 is followed thereafter. Since the current element is the tdn_digit, step 319 is followed by step 330, wherein the element is determined as a variable length element. At the next step 331, the backtrack is set to "1" and then the element, tdn_digit, is put to the stack 225 at step 332. At the next step 329, the next element, end_star, is retrieved from the element database 230 and returns to step 303 thereafter. Since the end_star is determined as neither the end element at step 303, nor one of the optional elements at step 305, leading to the next step 308, wherein it is found that the backtrack is set to "1", thus, at the next step 309, the backtrack is reset to "0". At the next step 311, the "*" is determined as corresponding to the code element and step 319 follows. The "*" is determined as a code element at step 319, it is found to match the end_star at step 320, it is checked that an element exists in the stack 225 at steps 321, and then the procedure leads through steps 322 and 323 to step 324 in the meanwhile the element in the stack 225 is removed and the digit in the T digit buffer 223 is transferred to the F digit buffer 224. Then, the step goes back to step 321, wherein no element is determined to be in the stack 225. Consequently, at step 328, the element is checked to be the end_star, thus the procedure returns to step 304, wherein the data concerning the deactivation of the SS request from the subscriber are removed from the SS information database 240 and the procedure ends.

In the latter code scheme case of "#+51+*+abd_digit+#", when the SS request signal of deactivation "#51" is received, it is interpreted in the same manner as the former case at the processing unit 220.

Thereafter, at step 301, the received data "#51" is interpreted and at step 302, the first element, star_digit, is fetched from the element database 230. Since the star_digit is determined as neither the end element at step 303, nor an optional element at step 305, and at step 308, it is found that the backtrack is not set to "1", the "*", is inputted by the user at step 310. Since the "*" is a code, step 311 is followed by step 319, wherein the element star_digit is determined as a code element, and at step 320, the star_digit is determined to match the received data "*", thus leading to step 321. At step 321, no element is found in the stack 225, and the element, star_digit, is determined not to be one of the end_star and the end_sharp at step 328, leading to step 329, wherein the next element, abd_digit, is retrieved from the element database 230 and the procedure returns to step 303. Since the abd_digit is determined as neither the end element at step 303, nor an optional element at step 305, and at step 308, it is found that the backtrack is not set to "1", and at the following step 310, a digit, "0", is inputted by the subscriber. At the next step 311, the digit, "0", is found not to correspond to a code element, and thus the digit is put to the T digit buffer 223 at step 312 and the procedure is led to step 313, wherein the element is found not to be a code element. At the next step 317, it is determined that the received digit count associated with the current element abd_digit is less than the digit count requirement, "2", the procedure leading to the next step 308, wherein it is found that the backtrack is not set to "1". At the next step 310, another digit, "1", is received. It is checked at step 311 if the digit, "1", corresponds to a code element, resulting in "Yes" and therefore, the digit is stored in the T digit buffer 223 at step 311, then leading to step 312. At step 312, it is found that the current element is not a code element, which leads to the next step 317, wherein the received digit count is found to fulfill the digit count requirement, "2". The digits, "01", stored in the T digit buffer 223 is transferred to the F digit buffer 224 at step 318 and then, the next digit, "#", is retrieved from the element database 230 at the next step 307 which then leads to the next step 303. Since the sharp_digit is determined as neither the end element at step 303, nor an optional element at step 305, and it is found that the backtrack is not set to "1" yet at step 308, at the next step 310, the "#", is received. At the next step 311, the "#", is determined to be a code element, leading to step 319, wherein the current element is determined as a code element and at the next step 320, the received data "#" matches the sharp_element. At the next step 321, it is found that there is no element in the stack 225, and the element is the end_sharp at step 328, and thus leading to step 304, wherein the data concerning the deactivation of the SS requested from the subscriber are removed from the SS information database 240 and then terminates the procedure.

So far, it has been shown through detailed descriptions of selected examples that the SS handling procedure in accordance with the present invention can be applied to any of the code schemes composed of any elements defined in the preferred embodiment of this invention. Because the SS handling procedure itself is universal, an operator's manipulation, for example, only reordering the elements of the code scheme at a console 250 coupled to the element database 230 in accordance with a designated code scheme, can make the SS handling procedure applicable to a wide variety of code schemes.

While the present invention has been described with respect to the preferred embodiments, other modifications and variations may be made without departing from the scope and spirit of the present invention as set forth in the following claims.

What is claimed is:

1. A method, for use in an electronic switching system, for processing a plurality of special services (SS's), wherein a SS is provided by manipulating input data from a subscriber's station in accordance with a code scheme which defmes a format of the input data for the SS, the switching system having a first and a second storage, the input data including SS data representing contents of the SS requested by a subscriber and the code scheme including a set of code elements having an identification code for identifying the SS, the method comprising the steps of:

provideing a plurality of code schemes;

storing the code schemes in the first storage;

receiving the input data and converting the received input data into a set of input codes;

detecting, from the set of input codes, an input code which corresponds to the identification cods;

generating an identification signal indicating the code scheme of the SS;

retrieving the code scheme from the first storage in response to the identification signal;

comparing the input codes and the code elements included in the code scheme;

generating a SS result which includes the SS data when a format of the input codes coincides with the one defined by the code scheme; and storing the SS result in the second storage.

2. The method of claim 1, wherein the input codes and the code elements are compared based on a predetermined comparing procedure.

3. The method of claim 2, wherein said predetermined comparing procedure is employed in processing the SS's.

4. An apparatus, for use in an electronic switching system, for processing a plurality of special services (SS's), wherein a SS is provided by manipulating input data from a subscriber's station in accordance with a code scheme which defines a format of the input data for the SS, the input data including SS data representing contents of the SS requested by a subscriber and the code scheme including a set of code elements having an identification code for identifying the SS, the apparatus comprising:

an input means for providing a plurality of code schemes;

a first storage means for storing the code schemes provided from the input means;

an interfacing means for receiving the input data and converting the received input data into a set of input codes;

means for detecting, from the set of input codes, an input code which corresponds to the identification code;

means for generating an identification signal indicating the code scheme of the SS;

means for retrieving the code scheme from the first storage means in response to the identification signal;

means for comparing the input codes and the code elements included in the code scheme;

means for generating a SS result which includes the SS data when a format of the input codes coincides with the one defined by the code scheme; and a second storage means for storing the SS result.

5. The apparatus of claim 4, wherein the input codes and the code elements are compared based on a predetermined comparing procedure.

6. The apparatus of claim 5, wherein said predetermined comparing procedure is employed in processing the SS's.

* * * * *